(12) United States Patent    (10) Patent No.:   US 12,597,366 B2

Seol et al.      (45) Date of Patent:     Apr. 7, 2026

(54) BRONCHOSCOPY SIMULATOR AND CONTROL METHOD FOR SAME

(71) Applicants: PUSAN NATIONAL UNIVERSITY INDUSTRY-UNIVERSITY COOPERATION FOUNDATION, Busan (KR); PUSAN NATIONAL UNIVERSITY HOSPITAL, Busan (KR)

(72) Inventors: Hee Yun Seol, Yangsan-si (KR); Seo Rin Kim, Yangsan-si (KR); Seok Young Ahn, Busan (KR); Hwan Yi Joo, Busan (KR); Joon Ho Moon, Busan (KR); Jae Young Kim, Busan (KR); Moon Chae Kim, Busan (KR)

(73) Assignees: PUSAN NATIONAL UNIVERSITY INDUSTRY-UNIVERSITY COOPERATION FOUNDATION, Busan (KR); PUSAN NATIONAL UNIVERSITY HOSPITAL, Busan (KR)

( * ) Notice: Subject to any disclaimer, the term of this patent is extended or adjusted under 35 U.S.C. 154(b) by 205 days.

(21) Appl. No.: 18/410,570

(22) Filed: Jan. 11, 2024

(65) Prior Publication Data

US 2025/0046213 A1     Feb. 6, 2025

(30) Foreign Application Priority Data

Aug. 3, 2023    (KR) ........................ 10-2023-0101400

(51) Int. Cl.
*G09B 23/28*      (2006.01)

(52) U.S. Cl.
CPC ................................. *G09B 23/285* (2013.01)

(58) Field of Classification Search
CPC ................ G09B 23/285; G09B 23/303; A61B 1/00057; A61B 1/2676
See application file for complete search history.

(56) References Cited

U.S. PATENT DOCUMENTS 5,120,299 A *   6/1992   Lombardi ............. A61M 25/06
                                      600/18
2006/0064159 A1*   3/2006   Porter ................. A61M 1/3659
                                     623/1.24

(Continued)

FOREIGN PATENT DOCUMENTS

CN       202615694 U   * 12/2012   ............. G09B 23/28
JP        2013-214108 A    10/2013

(Continued)

OTHER PUBLICATIONS

Korean Office Action for related KR Application No. 10-2023-0101400 mailed Feb. 3, 2024 from Korean Intellectual Property Office.

(Continued)

*Primary Examiner* — James S. McClellan
(74) *Attorney, Agent, or Firm* — Paratus Law Group, PLLC

(57) ABSTRACT

A bronchoscopy simulator includes: a main body part which is formed to be similar to the bronchial tree of the human body; and a bleeding producing part which is provided on the main body part to create a situation where bleeding occurs bronchial tree inside the main body part, thereby enabling practice of a response process for bleeding situations occurring during bronchoscopy. A control method for the bronchoscope simulator, includes: a bleeding occurrence step in which bleeding occurs inside a main body part by a bleeding simulation part; and a bleeding stop step, after hemostasis responding to the bleeding is performed, in (Continued)

which the bleeding is stopped by the bleeding simulation part.

5 Claims, 5 Drawing Sheets

(56) References Cited

U.S. PATENT DOCUMENTS

| | | | | |
|---|---|---|---|---|
| 2012/0302878 A1* | 11/2012 | Liu | ....................... | A61B 5/064 |
| | | | | 600/424 |
| 2019/0057621 A1* | 2/2019 | Broussard | ............ | G09B 23/303 |
| 2019/0251869 A1* | 8/2019 | Alsalemi | .............. | G09B 23/303 |
| 2021/0212830 A1* | 7/2021 | McCloskey | ......... | F04D 15/0066 |
| 2022/0354380 A1* | 11/2022 | Tata | ....................... | A61B 34/10 |
| 2023/0035936 A1* | 2/2023 | Bates | ................... | G09B 23/281 |
| 2023/0310062 A1* | 10/2023 | Gallet | ................... | A61B 17/29 |
| | | | | 606/1 |
| 2023/0360562 A1* | 11/2023 | Lavell | ................... | G09B 23/28 |

FOREIGN PATENT DOCUMENTS

| | | |
|---|---|---|
| JP | 5927389 B2 | 6/2016 |
| JP | 6260890 B2 | 1/2018 |
| KR | 10-0802137 B1 | 2/2008 |
| KR | 10-2009-0004350 A | 1/2009 |
| KR | 10-2015-0058382 A | 5/2015 |
| KR | 10-1979023 B1 | 5/2019 |

OTHER PUBLICATIONS

Korean Office Action for related KR Application No. 10-2023-0101400 mailed Aug. 12, 2024 from Korean Intellectual Property Office.
Korean Office Action for related KR Application No. 10-2023-0101400 mailed Feb. 18, 2025 from Korean Intellectual Property Office.

* cited by examiner

*20 : 21, 22, 23, 24

221          25          12

BRONCHOSCOPY SIMULATOR AND CONTROL METHOD FOR SAME

CROSS-REFERENCE TO PRIOR APPLICATION

This application claims priority to Korean Patent Application No. 10-2023-0101400 (filed on Aug. 3, 2023), which is hereby incorporated by reference in its entirety.

BACKGROUND

The present disclosure relates to a bronchoscopy simulator and a control method for the same, and more specifically, to a bronchoscopy simulator, which has a bleeding function that allows an user to become proficient at coping with bleeding situations occurring during bronchoscopy by reproducing the bleeding phenomenon in patients, and a control method for the same.

In general, a bronchoscopy simulator is provided as a model for mastering how to use a bronchoscope. The bronchoscope is inserted into the oral cavity, passes through the vocal cords, and reaches inside the bronchus to observe the surroundings.

Conventional bronchoscopy simulators are commonly used with the purpose of improving proficiency in the use of bronchoscopes. However, the conventional bronchoscopy simulators have a disadvantage of not being able to reproduce the bleeding phenomenon occurring during an actual bronchoscopy procedure.

For example, Patent Document 1 discloses a technology related to "Colon model creating method, collision detection method, and endoscope simulator method using the same". An objective of Patent Document 1 is to provide a method of creating a central line-based parameterized colon model from CT data of the colon, detecting a collision between a viewpoint position and the inner wall of a virtual colon model during colonoscopy simulation, and calculating a reaction force during the collision to transmit the calculated reaction force to a haptic device.

The colon model creating method, the collision detection method, and the endoscope simulator method using the same according to the Patent Document 1 have an advantage of providing an environment where inexperienced doctors can effectively learn various and complex medical techniques. However, as described above, the Patent Document 1 cannot realize the bleeding function in the endoscope simulator, so the inexperienced doctors cannot train in situations similar to actual conditions.

Related Art: Korean Patent No. 10-0802137

SUMMARY

Accordingly, the present disclosure has been made to solve the above-mentioned problems occurring in the prior arts, and it is an objective of the present disclosure to provide a bronchoscopy simulator to which a connection part connected to a conduit of a blood barrel to allow artificial blood to flow into the inside of the bronchoscopy simulator, thereby realizing the bleeding function, which can occur during actual endoscopy, such that an user can train in situations similar to actual conditions, compared to the conventional bronchoscopy simulators, and a control method for the same.

The objectives of the present disclosure are not limited to those mentioned above, and other objectives not mentioned herein will be clearly understood by those skilled in the art from the following description.

To accomplish the above object, according to the present disclosure, there is provided a bronchoscopy simulator including: a main body part which is formed to be similar to the bronchi of the human body; and a bleeding producing part which is provided on the main body part to create a situation where bleeding occurs inside the main body part, thereby enabling practice of a response process for bleeding situations occurring during bronchoscopy.

Moreover, the bleeding simulation part includes: a blood barrel in which artificial blood is accommodated; a conduit which is connected to the blood barrel and through which the artificial blood flows; an actuator which is located on one side of the conduit to transport the artificial blood; a valve which is located in a branch tube branching the conduit to regulate the bleeding pressure; and a tube which is connected to an end of the branch tube to be inserted into the main body part.

Furthermore, the artificial blood includes glycerin and saline solution.

Additionally, the bleeding simulation part further includes: a connector connected to an end of the branch tube, wherein the branch tube and the main body part are respectively inserted into both ends of the connecting part to connect the branch tube and the main body part with each other, such that the artificial blood in the branch tube can flow into the main body part.

In another aspect of the present disclosure, there is provided a control method for a bronchoscope simulator according including: a bleeding occurrence step in which bleeding occurs inside the main body part by the bleeding simulation part; and a bleeding stop step, after hemostasis responding to the bleeding is performed, in which the bleeding is stopped by the bleeding simulation part.

As described above, according to the present disclosure, the bronchoscopy simulator and the control method for the same can realize the bleeding function that can occur during actual endoscopy, such that an user can train in situations similar to actual conditions in performing bronchoscopy operation.

Furthermore, the bronchoscopy simulator and the control method for the same according to the present disclosure can selectively realize a desired bleeding function area in the endoscopy simulator, thereby allowing the user to become proficiency in handling various lesion locations within the bronchi.

The advantages of the present disclosure are not limited to the above-mentioned advantages, and other advantages, which are not specifically mentioned herein, will be clearly understood by those skilled in the art from the following description.

DETAILED DESCRIPTION

Terms will be used in this specification will be described in brief, and the present disclosure will be described in detail.

The terms including descriptive or technical terms which are used herein should be construed as having meanings that are obvious to one of ordinary skill in the art. However, the terms may have different meanings according to an intention of one of ordinary skill in the art, precedent cases, or the appearance of new technologies. Therefore, the terms used herein have to be defined based on the meaning of the terms together with the description throughout the specification.

Also, when a part "includes" or "comprises" a component, unless there is a particular description contrary thereto, the part can further include other components, not excluding the other components.

Hereinafter, with reference to accompanying drawings, the embodiments of the present disclosure will be described in detail so that the embodiments may be easily realized by those skilled in the art. However, the present disclosure may be implemented in various ways without being limited to the embodiments.

Specific matters including the objectives of the present disclosure, means for achieving the objectives, and the effect of the invention are included in the following embodiments and drawings. Advantages and features of the present disclosure, and method to achieve them of the present disclosure will be obvious with reference to embodiments along with the accompanying drawings which are described below.

Figure 1:
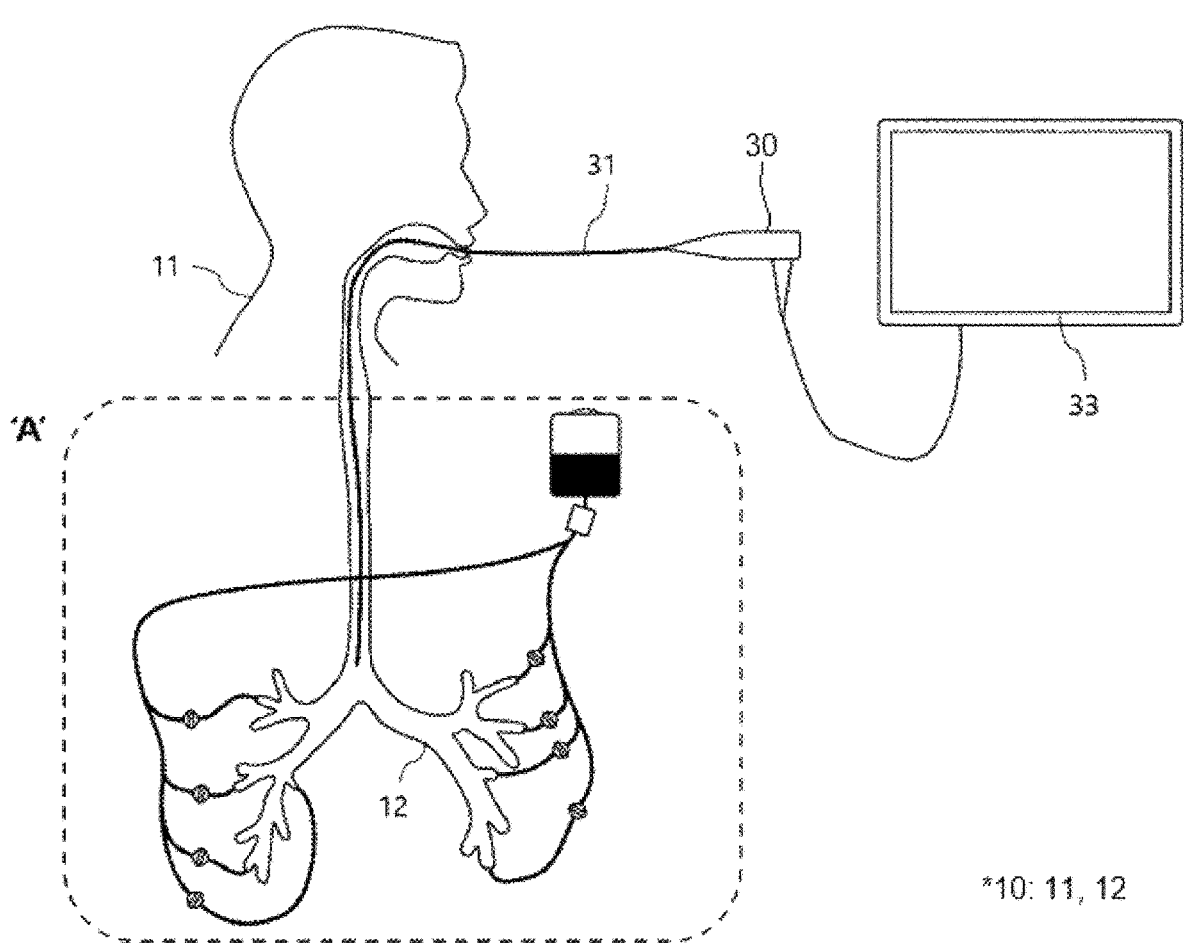
FIG. 1 is a view illustrating a bronchoscopy simulator according to the present disclosure.
Figure 2:
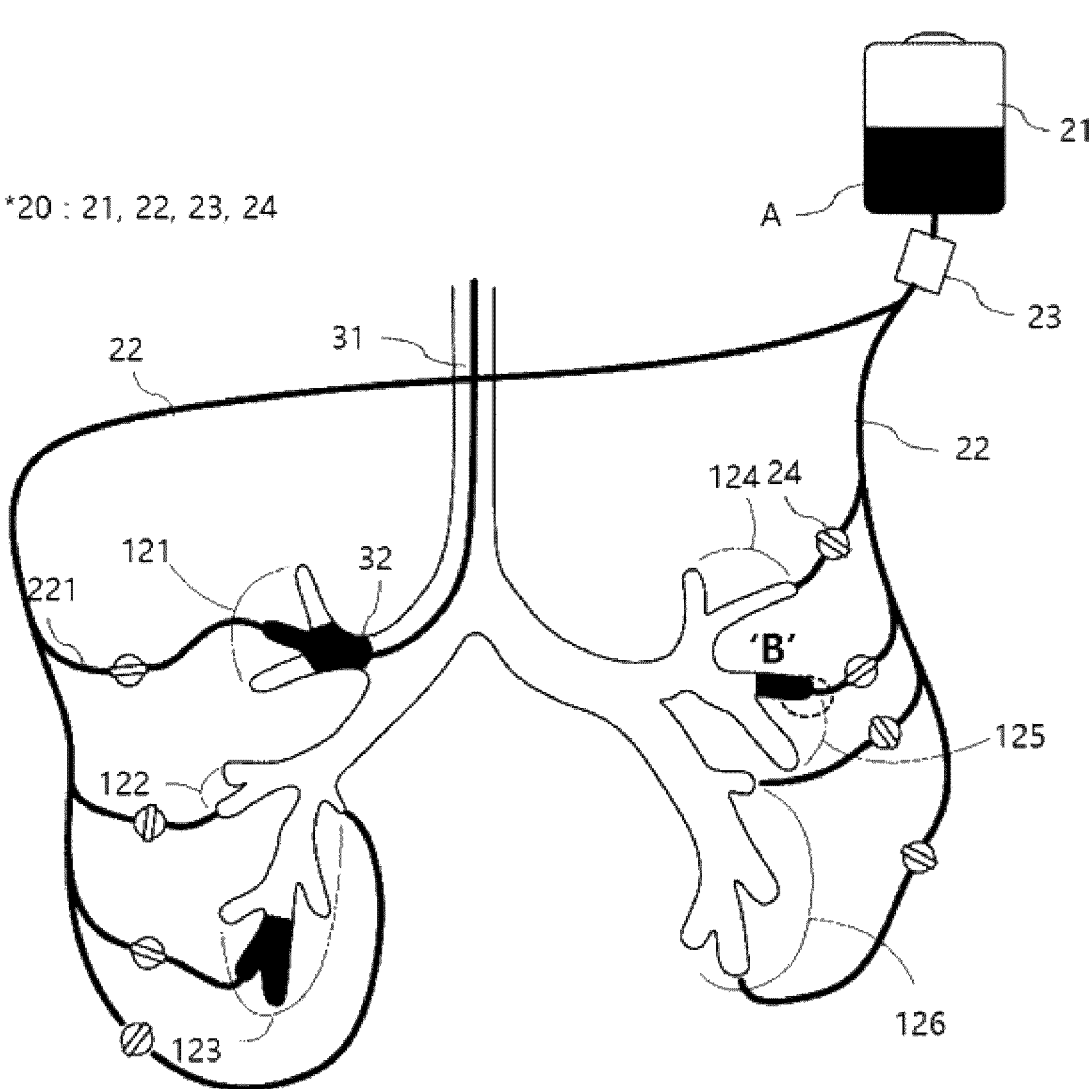
FIG. 2 is an enlarged view of a part 'A' in FIG. 1.
Figure 3:
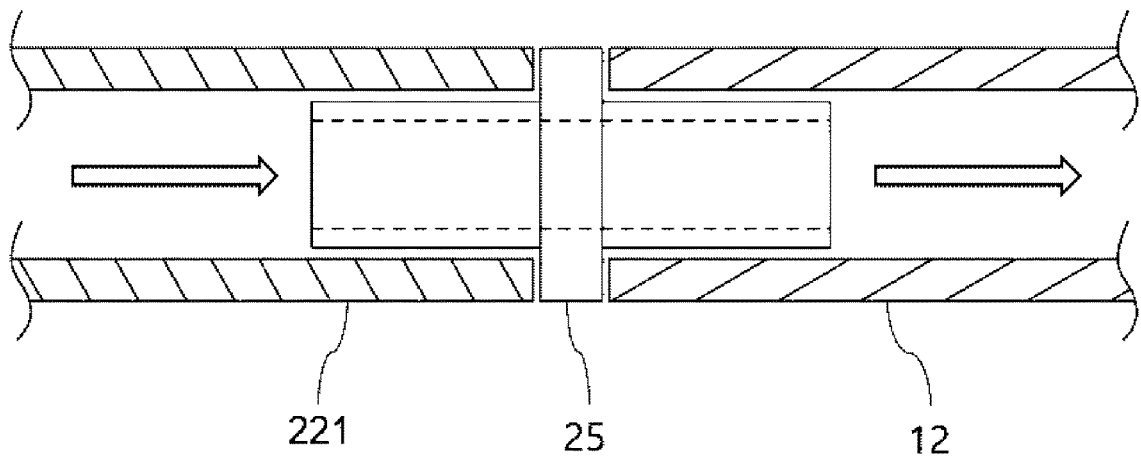
FIG. 3 is an enlarged view of a part 'B' in FIG. 2, illustrating a state in which a tube is connected to a connector and is inserted into the bronchoscopy simulator.
Figure 4:
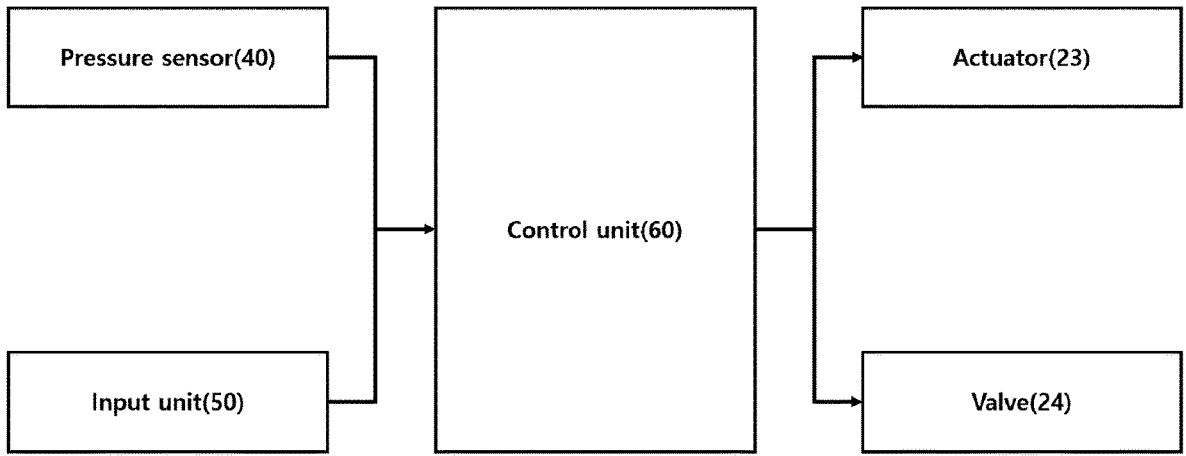
FIG. 4 is a configuration diagram of the bronchoscopy simulator according to the present disclosure.
Figure 5:
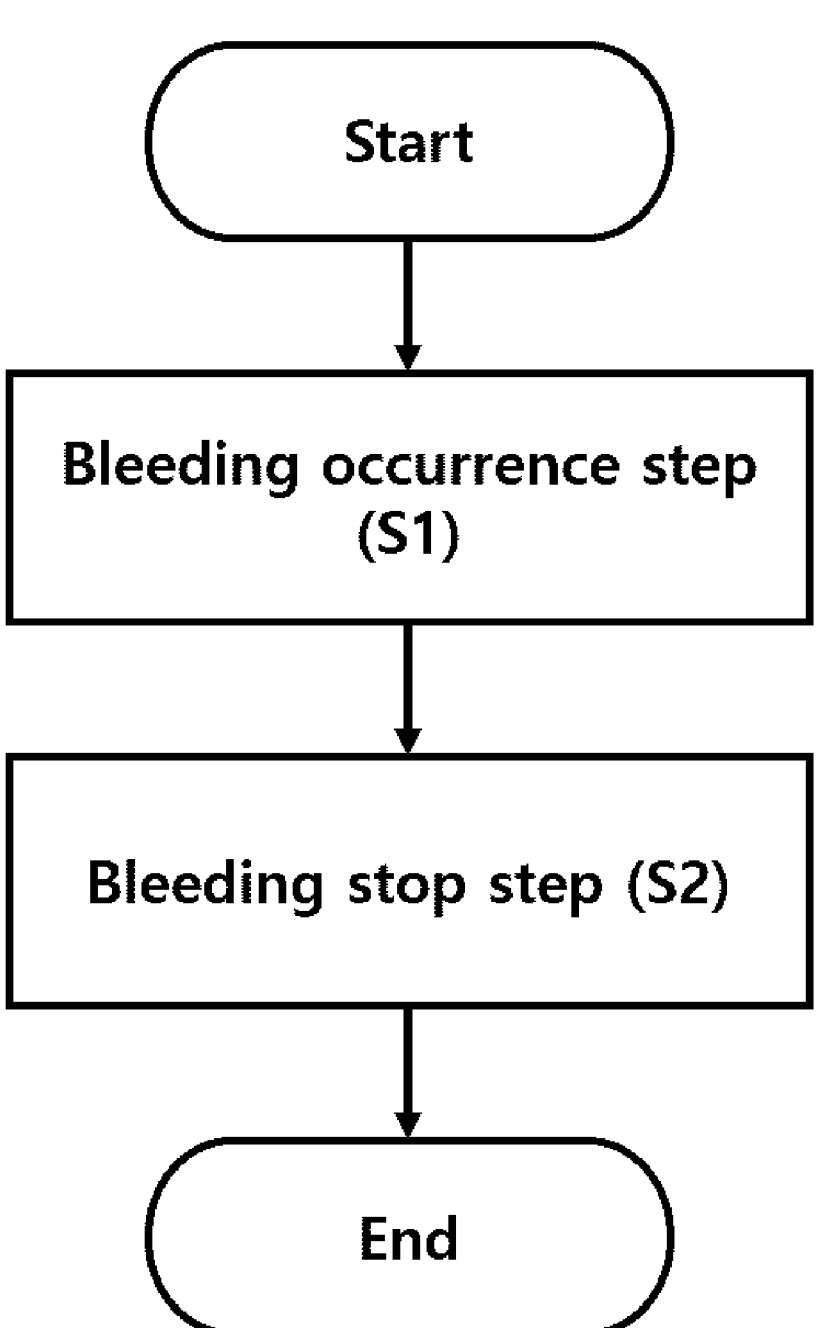
FIG. 5 is a flowchart of a control method for the bronchoscopy simulator according to the present disclosure.
Figure 6:
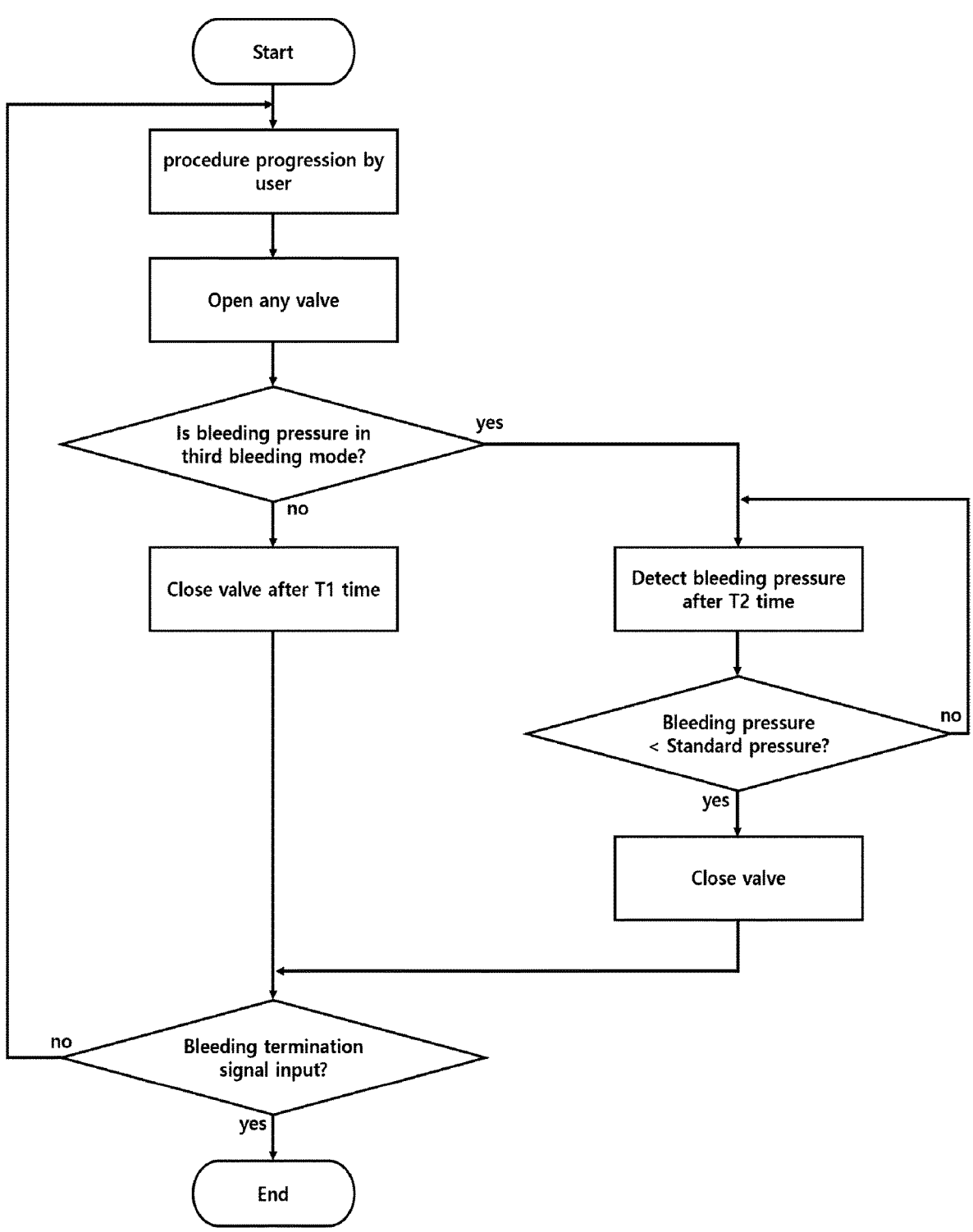
FIG. 6 is a control flow diagram of the bronchoscopy simulator according to the present disclosure.

FIG. 1 is a view illustrating a bronchoscopy simulator according to the present disclosure, FIG. 2 is an enlarged view of a part 'A' in FIG. 1, FIG. 3 is an enlarged view of a part 'B' in FIG. 2, illustrating a state in which a tube is connected to a connector and is inserted into the bronchoscopy simulator, FIG. 4 is a configuration diagram of the bronchoscopy simulator according to the present disclosure, FIG. 5 is a flowchart of a control method for the bronchoscopy simulator according to the present disclosure, and FIG. 6 is a control flow diagram of the bronchoscopy simulator according to the present disclosure.

Hereinafter, the bronchoscopy simulator according to the present disclosure will be described in detail with reference to the attached drawings.

The bronchoscopy simulator and the control method for the same according to the present disclosure can realize the bleeding function, which can occur during actual endoscopy, such that an user can train in situations similar to actual conditions, compared to the conventional bronchoscopy simulators, and a control method for the same.

The bronchoscopy simulator includes a main body part 10 formed similarly to the bronchi of the human body, and a bleeding producing part 20 which is provided in the main body part 10 to create a situation of bleeding inside the main body part 10.

First, the main body part 10 is provided. The main body part 10 is s formed identically to the bronchi of an actual patient. The main body part 10 is formed to provide an experience close to reality for the user who is performing bronchoscopy.

Moreover, the main body part 10 can be manufactured through a method of being initially printed using a water-soluble material with a 3D printer, coating the exterior of the printed product with a coating material, and passing a liquid, which can dissolve only the water-soluble material. In other words, the main body part 10 can be formed by being coated with the coating material.

Furthermore, one end of the main body part 10 is sealed with heat by using a device which can be heated by fire, such as a cauterizer, and the sealed area can be layered again with the coating material.

A head part 11 is formed in a shape similar to the head of the human body. Of course, the head part 11 can have eyes, a nose, a mouth, and a throat formed in shapes similar to those of the human body. The inside of the mouth can be formed in a shape similar to the oral cavity of the human body. Additionally, and the areas from the mouth to the throat are communicated.

A bronchial part 12 connects to the throat of the head part 11. Moreover, the bronchial part 12 is formed in a shape similar to the bronchi of the human body. Furthermore, the bronchial part 12 is coated with the coating material. That is, the outer surface of the bronchial part 12 is layered with the coating material. In this instance, the coating material is made of rubber-like material. Thus, the bronchial part 12 can provide a feeling very similar to an actual body.

The bronchial part 12 includes a right upper lobe bronchus 121, a right middle lobe bronchus 122, a right lower lobe bronchus 123, a left upper lobe bronchus 124, a lingula bronchus 125, and a left lower lobe bronchus 126.

The right upper lobe bronchus 121 is located closest to the head part 11 from the bronchial part 12. Additionally, the right middle lobe bronchus 122 is located below the upper lobe bronchus 121, and the right lower lobe bronchus 123 is located below the middle lobe bronchus 123. In other words, the right upper lobe bronchus 121 is provided at the topmost portion of the bronchial part 12, and then, the right middle lobe bronchus 122 and the right lower lobe bronchus 123 are sequentially provided. In addition, the right upper lobe bronchus 121, the right middle lobe bronchus 122, and the right lower lobe bronchus 123 are positioned on the right side based on the center of the bronchial part 12 when viewing the bronchial part 12 from the front.

The left upper lobe bronchus 124 is positioned closest to the head part 11 from the bronchial part 12. Additionally, the left lower lobe bronchus 126 is located below the left upper lobe bronchus 124. In other words, the left upper lobe bronchus 124 is provided at the topmost part of the bronchial part 12, and then, the lingula bronchus 125 and the left lower lobe bronchus 126 are sequentially provided. In addition, the left upper lobe bronchus 124, the lingula bronchus 125, and the left lower lobe bronchus 126 are positioned on the left side based on the center of the bronchial part 12 when viewing the bronchial part 12 from the front.

Additionally, inlet holes are formed on one side of the main body part 10. More specifically, the inlet holes are respectively formed at ends of the right upper lobe bronchus 121, the right middle lobe bronchus 122, the right lower lobe bronchus 123, the left upper lobe bronchus 124, the lingula bronchus 125, and the left lower lobe bronchus 126. The inlet holes are designed to allow artificial blood A, which will be described later, to flow into the right upper lobe bronchus 121, the right middle lobe bronchus 122, the right lower lobe bronchus 123, the left upper lobe bronchus 124, the lingula bronchus 125, and the left lower lobe bronchus 126. Thus, due to the inlet holes, the artificial blood A can be introduced into the right upper lobe bronchus 121, the right middle lobe bronchus 122, the right lower lobe bronchus 123, the left upper lobe bronchus 124, the lingula bronchus 125, and the left lower lobe bronchus 126, thereby producing a blooding situation that can occur during an actual bronchoscopy procedure.

Furthermore, multiple inlet holes can be formed in each of the right upper lobe bronchus 121, the right middle lobe bronchus 122, the right lower lobe bronchus 123, the left upper lobe bronchus 124, the lingula bronchus 125, and the left lower lobe bronchus 126. Preferably, four inlet holes can be formed in each of the right upper lobe bronchus 121, the right middle lobe bronchus 122, and the right lower lobe bronchus 123, and four inlet holes can be formed in each of the left upper lobe bronchus 124, and the left lower lobe bronchus 126. More preferably, one inlet hole can be formed in the right upper lobe bronchus 121, one in the right middle lobe bronchus 122, two in the right lower lobe bronchus 123, one in the left upper lobe bronchus 124, one in the lingula bronchus 125, and two in the left lower lobe bronchus 126.

Next, the bleeding producing part 20 is provided. The bleeding producing part 20 is equipped on one side of the main body part 10. The bleeding producing part 20 can produce a situation where bleeding occurs inside the main body part 10.

The bleeding producing part 20 includes a blood barrel 21 in which artificial blood A is accommodated, a conduit 22 which is connected to the blood barrel 21 and through which the artificial blood A flows, an actuator 23 which is located at one side of the conduit 22 tot transport the artificial blood A, and a valve 24 which is located in a branch tube 221 branched from the conduit 22 to regulate bleeding pressure.

The blood barrel 21 is a barrel having a hollow space therein. The artificial blood A is accommodated inside the blood barrel 21. In this instance, the artificial blood A can be made of glycerin and saline solution. Moreover, 5 to 50 parts by weight of glycerin can be provided based on 100 parts by weight of the saline solution. More preferably, 11.1 parts by weight of glycerin can be provided based on 100 parts by weight of the saline solution. Additionally, the artificial blood A can be provided in a quantity of more than 500 ml, which is sufficient for performing hemostasis.

The conduit 22 is a canal to transport the artificial blood A accommodated in the blood barrel 21 to the outside. Furthermore, the conduit 22 can branch off at one side to transport the artificial blood A to the right upper lobe bronchus 121, the right middle lobe bronchus 122, and the right lower lobe bronchus 123 on the left side, and the left upper lobe bronchus 124, the lingula bronchus 125, and the left lower lobe bronchus 126 on the right side. In other words, the conduit 22 is connected to the blood barrel 21 and branches toward the right upper lobe bronchus 121, the right middle lobe bronchus 122, the right lower lobe bronchus 123, the left upper lobe bronchus 124, the lingula bronchus 125, and the left lower lobe bronchus 126 on both the right and left sides.

Additionally, a branch tube 221 is provided at the end of the conduit 22. The branch tube 221 is a canal which branches again from the conduit 22 divided into right and left sides. The branch tube 221 can be provided in plural according to the number of the inlet holes. In addition, the branch tubes 221 can be connected to each conduit 22, respectively.

The actuator 23 is provided at a position before the conduit 22 branches off to the left and right sides. The actuator 23 is positioned at one side of the conduit 22 to ultimately transport the artificial blood A accommodated in the blood barrel 21 to the right upper lobe bronchus 121, the right middle lobe bronchus 122, the right lower lobe bronchus 123, the left upper lobe bronchus 124, the lingula bronchus 125, and the left lower lobe bronchus 126. In other words, the actuator 23 is a mechanical device capable of moving fluid. For example, the actuator 23 can be a water pump.

The valve 24 is provided to control the amount or pressure of the artificial blood A transported inside the branch tube 221 according to the rotational direction. In other words, the valve 24 can, for example, be a ball valve. Therefore, by rotating the valve 24, the artificial blood A can pass through the conduit 22, the branch tube 221, and a connector 25 in sequence and flow into the inlet hole.

Furthermore, the bleeding producing part 20 additionally includes the connector 25 connected to the end of the branch tube 221.

The connector 25 is formed as a conduit allowing the artificial blood A to flow through the interior thereof. That is, a through-hole (not shown) is formed inside the connector 25, such that the artificial blood A can flow into the through-hole. Additionally, the branch tube and the main body part are respectively inserted into both ends of the connector 25. Therefore, the connector 25 can connect the branch tube 221 to the bronchial part 12 of the main body part 10, so that the artificial blood of the branch tube can flow into the main body part.

In summary, the bleeding producing part 20 facilitates practicing a response procedure to bleeding situations occurring during bronchoscopy.

Additionally, the bronchoscopy simulator according to the present disclosure includes a bronchoscope 30 which is inserted into the main body part so that the user can perform an endoscopic procedure.

The bronchoscope 30 is a device for observing the bronchi of the human body. Accordingly, the bronchoscope 30 includes a miniature camera (not shown) for allowing the user to directly observe the inside, a tube 31 inserted to the bronchial part 12 through the head part 11, a balloon catheter 32 provided on one side of the tube 31 for hemostasis of blood vessels, and a display 33 connected to the camera to display images captured by the camera.

The balloon catheter 32 is provided to allow a balloon to expand. Therefore, in a state in which the bronchoscope 30 is inserted inside the main body part 10, the user can expand the balloon catheter 32 to perform hemostasis.

Furthermore, referring to FIG. 4, the bronchoscopy simulator according to the present disclosure further includes: a pressure sensor 40 which is provided on one side of the branch tube 221 to sense the bleeding pressure; an input unit 50 which allows user direct input to transmit a procedure progression signal and a bleeding termination signal; and a control unit 60 which controls the actuator 23 and the valve 24 based on the signals from the pressure sensor 40 and input unit 50.

The pressure sensor 40 is connected to the control unit 60. The pressure sensor 40 senses the bleeding pressure and can transmit data of the bleeding pressure to the control unit 60.

The input unit 50 is provided on one side of the bronchoscope 30 for allowing the user to directly input to transmit the procedure progression signal and the bleeding termination signal. The input unit 50 can adopt either a button input type or a touch input type. Additionally, the input unit 50 can also be provided in the form of a terminal carried by the user. In this instance, the terminal can be wirelessly connected to the bronchoscope 30. In addition, the input unit 50 is connected to the control unit 60, and the procedure progression signal and the bleeding termination signal input can be transmitted to the control unit 60.

The control unit 60 can automatically realize bleeding situations by opening at least one of the plurality of valves 24 based on the procedure progression signal input from the input unit 50 in the state in which the bronchoscope 30 is inserted.

Hereinafter, a control method for the bronchoscopy simulator according to the present disclosure will be described in detail with reference to the attached drawings. The control method for the bronchoscopy simulator is carried out using the bronchoscopy simulator.

Referring to FIG. 5, the control method for the bronchoscopy simulator according to the present disclosure includes: a bleeding occurrence step (S1) in which bleeding occurs inside the main body part 10 by the bleeding producing part 20; and a bleeding stop step (S2) in which the bleeding is stopped by the bleeding producing part 20 after the hemostasis responding to the bleeding is performed.

In the bleeding occurrence step (S1), bleeding is caused inside the main body part 10 by the bleeding producing part 20. More specifically, the bleeding occurrence step (S1) includes: an endoscope insertion step (S11) in which the bronchoscope 30 is inserted into the main body part 10; a tissue biopsy step (S12) in which a tissue biopsy is performed using the bronchoscope 30; and a valve opening step (S13) in which the valve 24 is opened by the control unit 60.

Referring to FIG. 6, the endoscope insertion step (S11) involves the process of inserting the bronchoscope 30 into the main body part 10. More specifically, the bronchoscope 30 is inserted through the mouth formed on the head part 11 and enters inside the bronchial part 12 connected to the throat of the head part 11.

In the tissue biopsy step (S12), a tissue biopsy is conducted using the bronchoscope 30. More specifically, the bronchoscope 30 approaches one of the right upper lobe bronchus 121, the right middle lobe bronchus 122, the right lower lobe bronchus 123, the left upper lobe bronchus 124, the lingula bronchus 125, and the left lower lobe bronchus 126. The user can perform a tissue biopsy, through the bronchoscope 30, by extracting a portion of the inner surface of one of the right upper lobe bronchus 121, the right middle lobe bronchus 122, the right lower lobe bronchus 123, the left upper lobe bronchus 124, the lingula bronchus 125, and the left lower lobe bronchus 126. The endoscope insertion step (S11) and the tissue biopsy step (S12) can be the procedure progression step performed by the user as illustrated in FIG. 6.

In the valve opening step (S13), the valve 24 is opened by the control unit 60. More specifically, the control unit 60 can arbitrarily open at least one of the plurality of valves 24. In other words, the control unit 60 can open the valve 24 arbitrarily to create the bleeding situation to at least one of the right upper lobe bronchus 121, the right middle lobe bronchus 122, the right lower lobe bronchus 123, the left upper lobe bronchus 124, the lingula bronchus 125, and the left lower lobe bronchus 126.

At this time, the opening extent of the valve 24 can be automatically adjusted by the control unit 60. More specifically, the control unit 60 can control the valve 24 to be opened in three stages. In the first stage, the control unit 60 partially opens the valve 24 to arbitrarily create a first bleeding mode. In the second stage, the control unit 60 opens the valve 24 more than in the first stage to arbitrarily create a second bleeding mode. In the third stage, the control unit 60 opens the valve 24 more than in the second stage to create a third bleeding mode. In simple terms, the control unit 60 can arbitrarily create the first, second, and third bleeding modes by adjusting the opening extent of the valve 24.

Of course, based on the procedure progression signal input from the input unit 50, the control unit 60 controls the operation of the actuator 23 in the state in which the bronchoscope 30 is inserted, to automatically realize the bleeding situations. The valve opening step (S13) can be any one of the valve opening stages as illustrated in FIG. 6.

Next, in the bleeding cessation step (S2), after the hemostasis responding to the bleeding is performed, the bleeding is stopped by the bleeding producing part 20. More specifically, the bleeding step a hemostasis cessation (S2) includes performance step (S21) in which hemostasis is performed using the balloon catheter 32, and a valve closing step (S22) in which the valve 24 is closed by the control unit 60.

In the hemostasis performance step (S21), hemostasis is performed using the balloon catheter 32. More specifically, in the state in which the bleeding situation is created through the valve opening step (S13), the balloon catheter 32 provided on one side of the bronchoscope 30 is expanded to block the inner surface of the bronchial part 12, thereby preventing the artificial blood A from leaking out.

The valve closing step (S22) is a process of closing the valve 24 by the control unit 60. More specifically, the control unit 60 can control the operation of the valve based on the bleeding pressure sensed by the pressure sensor to automatically close the valve. More specifically, the control unit 60 can check which bleeding mode the bleeding pressure corresponds to. The bleeding mode includes a first bleeding mode, a second bleeding mode, and a third bleeding mode. The first bleeding mode is involved with a flow rate where the artificial blood A is discharged in a droplet form through the connector 25. The second bleeding mode is involved with a flow rate where the artificial blood A is discharged in a flowing form through the connector 25. The third bleeding mode is involved with a flow rate where the artificial blood A is discharged in a spurting form through the connector 25. In other words, the bleeding pressure increases in the order of the first mode, the second mode, and the third bleeding mode.

The control unit 60 organically controls the actuator 23 and valve 24 to implement the bleeding modes. In other words, the control unit 60 can realize the flow rates corresponding to the first, second, and third bleeding modes through the actuator 23 and the valve 24. For example, the control unit 60 can control the operating speed of the actuator 23 and the opening and closing of the valve 24.

Additionally, the control unit 60 can close the valve 24, which was opened after a first time period (T1), when the bleeding pressure is in the first bleeding mode or the second bleeding mode. Additionally, the control unit 60 can detect the bleeding pressure after a second time period (T2) when the bleeding pressure is in the third bleeding mode. The control unit 60 then checks whether the bleeding pressure is less than a standard flow rate. In this instance, if the bleeding pressure is greater than the standard flow rate, the control unit 60 detects the bleeding pressure again after the second time period (T2), and if the bleeding pressure is less than the standard flow rate, the control unit 60 can close the opened valve 24. Thus, the valve 24 is closed at different intervals of time according to the bleeding pressure for different bleeding modes.

Furthermore, the control unit 60 can control the operation of multiple valves based on the bleeding termination signal input from the input unit to automatically end the bleeding situation. Of course, if there is no bleeding termination signal, the user can continue the procedure. In addition, the valve closing step (S22) can be a process following the step of opening any arbitrary valve as illustrated in FIG. 6.

Additionally, the control method for the bronchoscopy simulator according to the present disclosure can further include a blood removal step (S3). The blood removal step (S3) allows all the remaining artificial blood A inside the main body part 10 to be removed by opening all the valves 24 after the valve closing step (S22). More specifically, after the valve closing step (S22), the conduit 22 can be connected to a drainage tank (not shown) instead of the blood barrel 21. Then, the valve 24 is fully opened to remove the artificial blood A from the main body part 10 in a dropping manner.

It should be understood that the technical configuration of the present disclosure can be realized in other specific forms by those skilled in the art without changing the technical spirit or essential features of the present disclosure.

Therefore, the embodiments described above should be considered in all respects as illustrative and not restrictive. The scope of the present disclosure is defined by the appended claims, rather than the above description, and all changes or modifications derived from the meaning, scope and equivalents of the appended claims should be interpreted as falling within the scope of the present disclosure.

What is claimed is:

1. A bronchoscopy simulator comprising:
a main body part formed to be similar to a bronchial tree of a human body; and
a bleeding producing part provided on the main body part and configured to reproduce a bleeding condition inside the main body part,
wherein the bleeding producing part comprises:
an actuator configured to transport artificial blood into the main body part;
at least one valve configured to regulate a bleeding pressure of the artificial blood so as to reproduce a bleeding situation;
a pressure sensor configured to sense the bleeding pressure in the main body part; and
a controller configured to initiate reproduction of the bleeding condition after a bronchoscope is inserted into the main body part to assist a user in practicing responses to bleeding situations occurring during a bronchoscopy procedure,
wherein the controller is further configured to close the at least one valve when the bleeding pressure sensed in the main body part becomes equal to or lower than a reference pressure in response to a hemostasis operation applied to the main body part.

2. The bronchoscopy simulator according to claim 1, wherein the bleeding producing part further comprises:
a blood barrel in which the artificial blood is accommodated;
a conduit connected to the blood barrel and through which the artificial blood flows; and
a branch tube branching from the conduit and connected to the main body part,
wherein the actuator is located on the conduit to transport the artificial blood; blood, and
the at least one valve is located on branch tube to regulate the bleeding pressure.

3. The bronchoscopy simulator according to claim 2, wherein the artificial blood includes glycerin and a saline solution.

4. The bronchoscopy simulator according to claim 2, wherein the bleeding producing part further includes:
a connector connected to an end of the branch tube,
wherein the branch tube and the main body part are respectively inserted into opposite ends of the connector such that the artificial blood in the branch tube flows into the main body part.

5. The bronchoscopy simulator of claim 1, wherein the controller further configured to:
(i) open the at least one valve in response to a procedure progression signal to initiate bleeding at a selectively designated bronchial location;
(ii) adjust an opening extent of the at least one valve to create multiple distinct bleeding modes corresponding to different flow rates of the artificial blood; and
(ii close the valve after a first time period when the bleeding pressure is in the first or second bleeding mode, and after a second time period when the bleeding pressure is in the third bleeding mode, based on the bleeding pressure sensed by the pressure sensor.

* * * * *